United States Patent [19]

Kohmoto

[11] Patent Number: 5,043,752
[45] Date of Patent: Aug. 27, 1991

[54] CAM MECHANISM IN ZOOM LENS

[75] Inventor: Shinsuke Kohmoto, Tokyo, Japan

[73] Assignee: Asahi Kogaku Kogyo Kabushiki Kaisha, Tokyo, Japan

[21] Appl. No.: 359,491

[22] Filed: May 31, 1989

[30] Foreign Application Priority Data

Jun. 1, 1988 [JP] Japan .................. 63-72988

[51] Int. Cl.$^5$ .............................................. G03B 1/18
[52] U.S. Cl. .............................. 354/195.12; 359/700; 359/701
[58] Field of Search ................. 354/195.1, 195.12; 350/429, 430

[56] References Cited

U.S. PATENT DOCUMENTS

| 4,324,457 | 4/1982 | Tomori | 350/430 |
| 4,411,498 | 10/1983 | Muryoi | 350/429 |
| 4,506,959 | 3/1985 | Hama | 350/429 X |
| 4,848,884 | 7/1989 | Enomoto | 350/430 X |

FOREIGN PATENT DOCUMENTS 1421522 9/1989 United Kingdom .

Primary Examiner—Brian W. Brown
Attorney, Agent, or Firm—Sandler, Greenblum & Bernstein

[57] ABSTRACT

A cam mechanism in a zoom lens having a stationary barrel secured to a camera body, a cam ring rotatably fitted in the stationary barrel, a front lens group frame movable in the optical axis direction in the cam ring, a front lens group integrally supported by the front lens group frame, and a rear lens group supported in the cam ring so as to move in the optical axis direction. The cam ring is provided with front lens group cam grooves and rear lens group cam grooves, so that when the cam ring rotates, the front lens group and the rear lens group are moved in the optical axis direction. The number of the front lens group cam grooves is larger than that of the rear lens group cam grooves.

16 Claims, 2 Drawing Sheets

CAM MECHANISM IN ZOOM LENS

BACKGROUND OF THE INVENTION

1. Field of the Invention

The present invention relates to a cam mechanism for preventing the inclination and fluctuation (e.g. accidental movement) of a lens barrel with respect to an optical axis, which would otherwise occur during zooming, in a camera, particularly in a lens shutter type of camera having a zoom lens.

2. Description of Related Arts

The assignee of the present application has proposed a back focus adjusting mechanism of a zoom lens camera in which a distance between a plane of a rearmost lens of the zoom lens and a film plane can be easily adjusted, as disclosed for example in Japanese Patent Application No. 63-32544, Japanese Utility Model Application Nos. 63-18457 and 63-18458, and U.S. Patent applicaton Ser. No. 310,191.

In a zoom lens, as disclosed in these prior applications, front and rear groups of lenses are supported by a frame (lens barrel) of the front lens group which can be moved in the optical axis direction in accordance with the rotation of a cam ring. The cam ring is provided with four cam grooves, two for the front lens group and two for the rear lens group. Pins which are provided on the frames of the front lens group and rear lens group are fitted in the respective cam grooves.

In the lens supporting mechanism having the cam construction mentioned above, if the travel distance of the front lens group frame is large, the length of the engagement between the front lens group frame and the cam ring at the forward end of the movement of the front lens group frame is insufficient, so that the front lens group frame tends to be inclined or accidentally moved with respect to the optical axis, resulting in a deviated optical axis.

SUMMARY OF THE INVENTION

The primary object of the present invention is to provide a compact cam mechanism in a zoom lens, particularly one having a long travel distance of the front lens group (a lens barrel supporting the front lens group), in which no deviation of the optical axis takes place when the front lens group moves during zooming.

The inventor of the present invention has discovered that the fluctuation of the front lens group frame can be prevented by the provision of increased numbers of cam grooves and pins associated therewith provided on the front lens group frame and the cam ring. To this end, the cam ring has a larger number of cam grooves for the front lens group than that of the cam grooves for the rear lens group. The front lens group frame has a corresponding number of pins which are fitted in the cam grooves for the front lens group, so that no inclination of the front lens group frame and the front lens group occurs. A cam mechanism in a zoom lens having a stationary barrel is secured to a camera body, a cam ring is rotatably fitted in the stationary barrel, a front lens group frame is movable in the optical axis direction in the cam ring, a front lens group is integrally supported by the front lens group frame, and a rear lens group is supported in the cam ring so as to move in the optical axis direction. The cam ring is provided with front lens group cam grooves and rear lens group cam grooves, so that when the cam ring rotates, the front lens group and the rear lens group are moved in the optical axis direction. To achieve the object mentioned above in this structure the number of the front lens group cam grooves is larger than the number of the rear lens group cam grooves.

The stationary barrel has at least one straight guide groove. The front lens group frame has at least one pin which extends through the associated front lens group cam groove to be fitted in the straight guide groove and at least one pin which is fitted in the associated front lens group cam groove but does not project therefrom.

With this arrangement, a space in the vicinity of the cam groove in which the pin which does not protrude from the front lens group cam groove can be effectively utilized. For example, a focal length detecting code plate can be located on the pin which is fitted in the associated front lens group cam groove but does not project therefrom to detect the focal length in accordance with the angular displacement of the cam ring.

Preferably, the number of the front lens group cam grooves is more than two, preferably spaced at an equiangular distance. Preferably, one or two rear lens group cam grooves is or are provided between the front lens group cam grooves.

In an alternative embodiment of the invention, it is possible to provide a thrust member on the cam ring to move the latter thereby to effect a back focus adjustment.

Preferably, a shutter unit is provided on the front lens group frame. The shutter unit can be connected to a flexible circuit board which can be bent and guided by a direction turning member integral with the front lens group at the rear end of the latter. The direction turning member of the flexible circuit board makes it possible to absorb the movement of the flexible circuit board due to the large displacement of the front lens group.

DETAILED DESCRIPTION OF PREFERRED EMBODIMENTS

Figure 1:
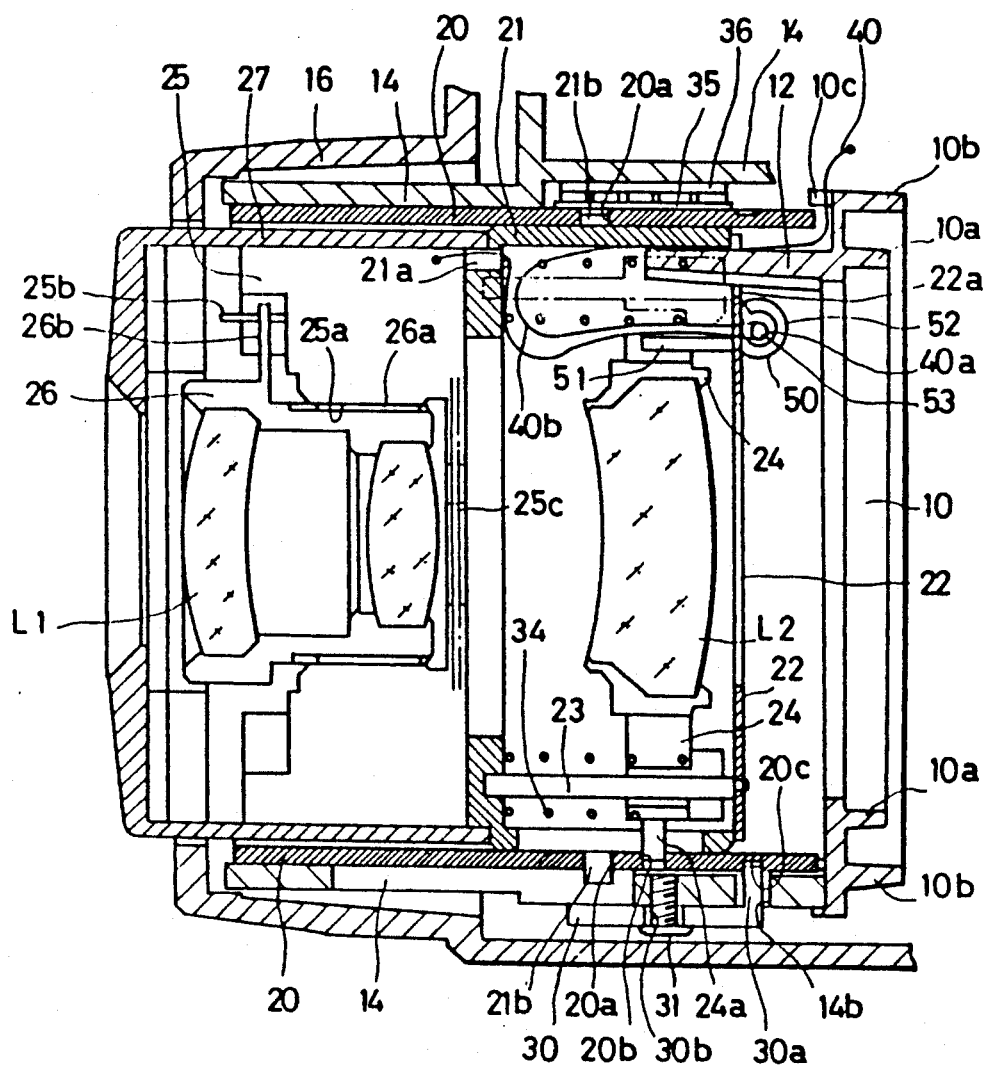
FIGS. 1 and 2 are longitudinal sectional views of a main part of a lens shutter type of camera having a zoom lens, shown in different operational positions, according to an embodiment of the present invention; and, FIG. 3 is a developed view of a cam ring shown in FIGS. 1 and 2.

In the drawings, the lens shutter type of camera has a variable power lens for varying a magnification having front group of lens (front lens group L1) and rear group of lens (rear lens group L2), in which the front lens group L1 also serves as a focusing lens. A camera body 10 and a stationary barrel 14 located in front of the camera body 10 are stationary elements of the camera. The body 10 has a guide piece 12 which extends in the stationary barrel 14, and inner and outer rails 10a and 10b which are located behind the guide piece 12 to form a guide for the travel of a film (not shown). The camera body 10 and stationary barrel 14 are covered by camera body case 16.

Figure 3:
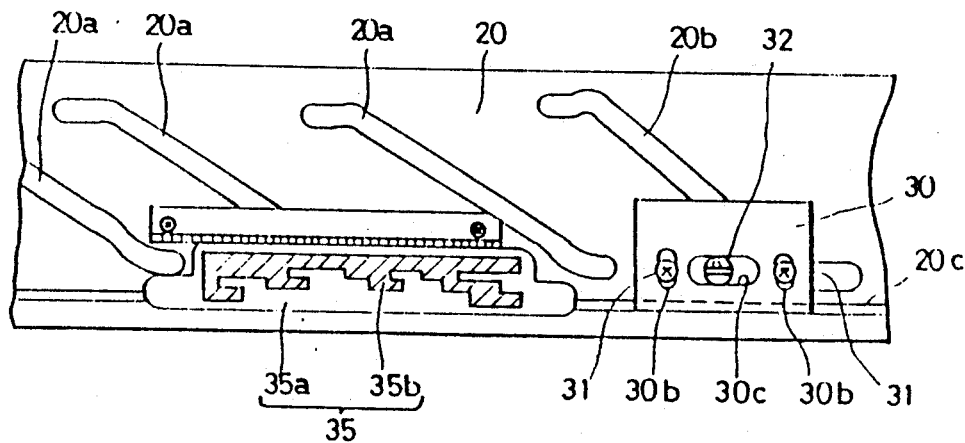

A cam ring 20 is rotatably fitted in the inner periphery of the stationary barrel 14. The cam ring 20 has three cam grooves 20a along which the front lens group L1 is moved in the optical axis direction, and one cam groove 20b along which the rear lens group L2 is moved in the optical axis direction (FIG. 3). The three front lens cam grooves 20a are preferably spaced from one another at a substantially equiangular distance.

In the cam ring 20 is fitted a front lens group frame (lens barrel) 21 which is movably supported in the optical axis direction. A light intercepting plate 22 is secured to the rear end of the front lens group frame 21. More than one parallel guide rod 23 are immovably provided in the front lens group frame 21. The guide rods 23 are connected at their front ends to a flange portion 21a which projects inwards from the front end of the front lens group frame 21, and at their rear ends to the light intercepting plate 22. A rear lens group frame 24 which has the rear lens group L2 secured thereto is supported by the guide rods 23 so as to move in the optical axis direction.

As described above, the cam ring 20 has three front lens group cam grooves 20a and one rear lens group cam groove 20b for moving the front lens group L1 and the rear lens group L2 along predetermined tracks defined by the profiles of the cam grooves. The front lens group frame 21 has three pins 21b which are fitted in the front lens group cam grooves 20a.

Two of the pins 21b extend through the front lens group cam groove 20a to be fitted in straight guide grooves 14a which extend in the optical axis direction and which are formed in the stationary barrel 14, and the remaining pin 21b is fitted in the associated front lens group cam groove 20a so as not to protrude therefrom. Consequently, the front lens group frame 21 can be moved only in the optical axis direction without rotating, by the pins 21b which are fitted in the straight guide grooves 14a. The main features of the present invention resides in the provision of the three front lens group cam grooves 20a which are greater in number than the rear lens group cam grooves 20b on the cam ring 20, and the provision of the three pins 21b on the front lens group frame 21, one of which pins 21b does not protrude beyond the associated front lens group cam groove 20a.

The rear lens group frame 24 has one pin 24a which extends through a through opening (groove) 21c formed on the front lens group frame 21 to be fitted in the rear lens group cam groove 20b of the cam ring 20. Note that the pin 24a is shown in the same sectional view as the pin 21b for the purpose of clarification, but in fact they are located at different phases that is, they actually do not appear in the same sectional view).

The cam ring 20 is driven to rotate by a driving motor (not shown) through a gear train (not shown). When cam ring 20 is rotated, the front lens group frame 21, and accordingly the front lens group L1 are moved in the optical axis direction with the help of the front lens group cam grooves 20a and the straight guide grooves 14a, so that the rear lens group frame 24, which is restricted by the guide bars 23 so as not to rotate, and accordingly the rear lens group L2 are moved in the optical axis direction in accordance with the rear lens group cam groove 20b. During the movement of the front lens group L1, rear lens group L2 are moved also as a whole while adjusting the spatial distance therebetween to effect the zooming operation.

The flange portion 21a of the front lens group frame 21 has an annular shutter unit 25 secured thereto, which is screw-engaged at its inner periphery by a front lens group holding ring 26 through helicoids 25a and 26a, so that the front lens group L1 is secured to the front lens group holding ring 26.

The shutter unit 25 rotates a driving pin 25b thereof by an angle corresponding to an object distance which is detected by an object distance measuring device (not shown) and opens and closes a shutter sector 25c of the shutter unit in accordance with a measuring light signal generated by a photometer (not shown). The driving pin 25b is continuously engaged by an association arm 26b which is secured to the front lens group holding ring 26, so that when the driving pin 25b rotates, the front lens group holding ring 26 is moved in the optical axis direction in accordance with an angular displacement of the association arm 26b to effect focusing. Numeral 27 designates a cylindrical lens cover secured to the outer periphery of the shutter unit 25.

The rear lens group frame 24 is continuously biased into the rearmost position by coil springs 34 which surround the guide rods 23.

Between the cam ring 20 and the stationary barrel 14 is provided a back adjusting mechanism which has a thrust member 30 as a main element which is attached on the outer periphery of the stationary barrel 14 so as to move in the optical axis direction, so that a slight movement of the cam ring 20 in the thrust direction occurs. The front end 30a of the thrust member 30 extends through a circumferential idle groove (through opening) 14b of the stationary barrel 14 to be fitted in a circumferential groove 20c of the cam ring 20.

The thrust member 30 has two parallel guide holes 30b extending in the optical axis direction and a circumferential groove 30c. In each guide hole 30b is fitted a set screw 31 which is screwed in the stationary barrel 14. An eccentric pin 32 which is pivoted to the stationary barrel 14 is fitted in the circumferential groove 30c. Consequently, the thrust member 30 is guided by the guide holes 30b and the set screws 31 fitted therein to move in the optical axis direction. The thrust member 30 can be locked at a desired position by fastening the set screws 31. Also, the thrust member 30 can be moved in the optical axis direction by the circumferential groove 30c and the eccentric pin 32, so that the rotation of the eccentric pin 32 causes the thrust member 30 and the cam ring 20 to move in the optical axis direction, thereby to move the front lens group L1 and the rear lens group L2 together in the optical axis direction to effect the back adjustment (back focusing). The engagement between the thrust member 30 and the cam ring 20 can be realized also by the grooves provided on the thrust member 30 and projections engaging in the grooves, on the cam ring 20.

On the outer peripheral surface of the cam ring 20 is secured a focal length code plate 35 for detecting the focal length, which covers only the cam groove 20a from which the pin 21b does not protrude. Namely, the remaining cam grooves 20a and 20b are not covered by the focal length code plate 35.

The focal length code plate 35 has an insulation substrate 35a and an elongated conductor 35b formed on the insulation substrate 35a. The elongated conductor 35b has four rows of bands in the optical axis direction, each having discontinued conductor portions spaced at a predetermined circumferential distance. Namely, a plurality of codes, each formed in the optical axis direction, are spaced at a predetermined circumferential distance. Each code forms a signal which represents a discontinuous (stepped) focal length of the zoom lens.

A brush 36 is provided on the stationary barrel 14 to be opposed to the focal length code plate 35 in order to read the codes. Thus, the focal length of the zoom lens corresponding to the angular position of the cam ring 20 can be detected by the focal length code plate 35 and the brush 36.

The shutter unit 25 has a flexible board 40 connected thereto, which transmits the various signals from the object distance measuring device and the photometer on the camera body side to the shutter unit 25. The flexible board 40 is, as is well known, made of a flexible synthetic resin substrate which has a plurality of leads formed thereon and insulated from one another. The flexible board 40 is connected at its rear end to a CPU (control unit) in the camera body.

The flexible board 40 connected to the shutter unit 25 extends in an annular space defined between the front lens group frame 21 and the rear lens group frame 24 to come into the guide piece 12 of the camera body 10 and reaches a direction turning member 50 mounted to the light intercepting plate 22. The flexible board 40 is bent in the direction turning member 50 to change the direction of extension thereof, so that the flexible board 40 reaches the vicinity of the shutter unit 25 where the flexible board 40 is bent again rearward. Then, the flexible board 40 extends in a space defined by the front lens group frame 21 and the guide piece 12 and is introduced to the outside of the front lens group frame 21 through a window 22a of the light intercepting plate 22 formed above the direction turning member 50. The flexible board 40 further extends in an annular space defined by the cam ring 20 and the guide piece 12 to come into the camera body through a window 10c formed on the base portion of the camera body 10. The portions of the flexible board 40 that are bent in the direction turning member 50 and in the vicinity of the shutter unit 25 will be referred to as immovable bent portion 40a and movable bent portion 40b, respectively.

The direction turning member 50 has a guide plate portion 51, and a cylindrical portion 52 integral therewith and perpendicular to the length of the guide plate portion 51, so that the direction turning member 50 is generally J-shaped in plan view.

The direction turning member 50 is secured to the light intercepting plate 22 so that the guide plate portion 51 extends in parallel with the optical axis. The flexible board 40 is introduced into the cylindrical portion 52 along the guide plate portion 51, so that the flexible board 40 is wound around a pin 53 to change the direction thereof in order to extend in the forward direction.

The operation and function of the above-mentioned zoom lens will be discussed below with reference to FIGS. 1 and 2.

At the shortest focal length at which the front and rear lens groups L1 and L2 are brought into the rearmost positions, so that the lens cover 27 is retracted most in the camera body case 16, as shown in FIG. 1, the lens cover 27 and the front lens group frame 21 are engaged by the cam ring 20 with a sufficient length of engagement (overlapping length). Accordingly, there is no possibility that the lens cover 27 and the front lens group 21 are inclined with respect to the optical axis, resulting in the deviation of the front and rear lens groups L1 and L2.

The flexible board 40 is bent three times by the immovable bent portion 40a, the movable bent portion 40b and in the annular space defined between the front lens group frame 21 and the rear lens group frame 24. The guide plate portion 51 guides the flexible board 40, so that the portion of the flexible board 40 that is located closest to the optical axis does not come into the optical axis.

When the zooming is effected, the cam ring 20 is rotated, so that the front lens group frame 21 and the rear lens group frame 24 are moved forward through the pins 21b which are fitted in the front lens group cam grooves 20a and the pin 24a which is fitted in the rear lens group cam groove 20b, respectively. Namely, the front lens group L1 and the rear lens group L2 are advanced while changing the spatial distance therebetween in accordance with the profiles of the cam grooves 20a and 20b. This is the zooming operation, as mentioned before.

Since the shutter unit 25 moves forward together with the front lens group frame 21, the shutter unit 25 comes away from the camera body. However, since the direction turning member 50 moves integrally with the front lens group frame 21, the immovable bent portion 40a also moves together with the front lens group frame 21, so that there is no change in a distance between the shutter unit 25 and the immovable bent portion 40a. Consequently, the movable bent portion 40b is moved forward in accordance with the movement of the front lens group frame 21.

Figure 2:
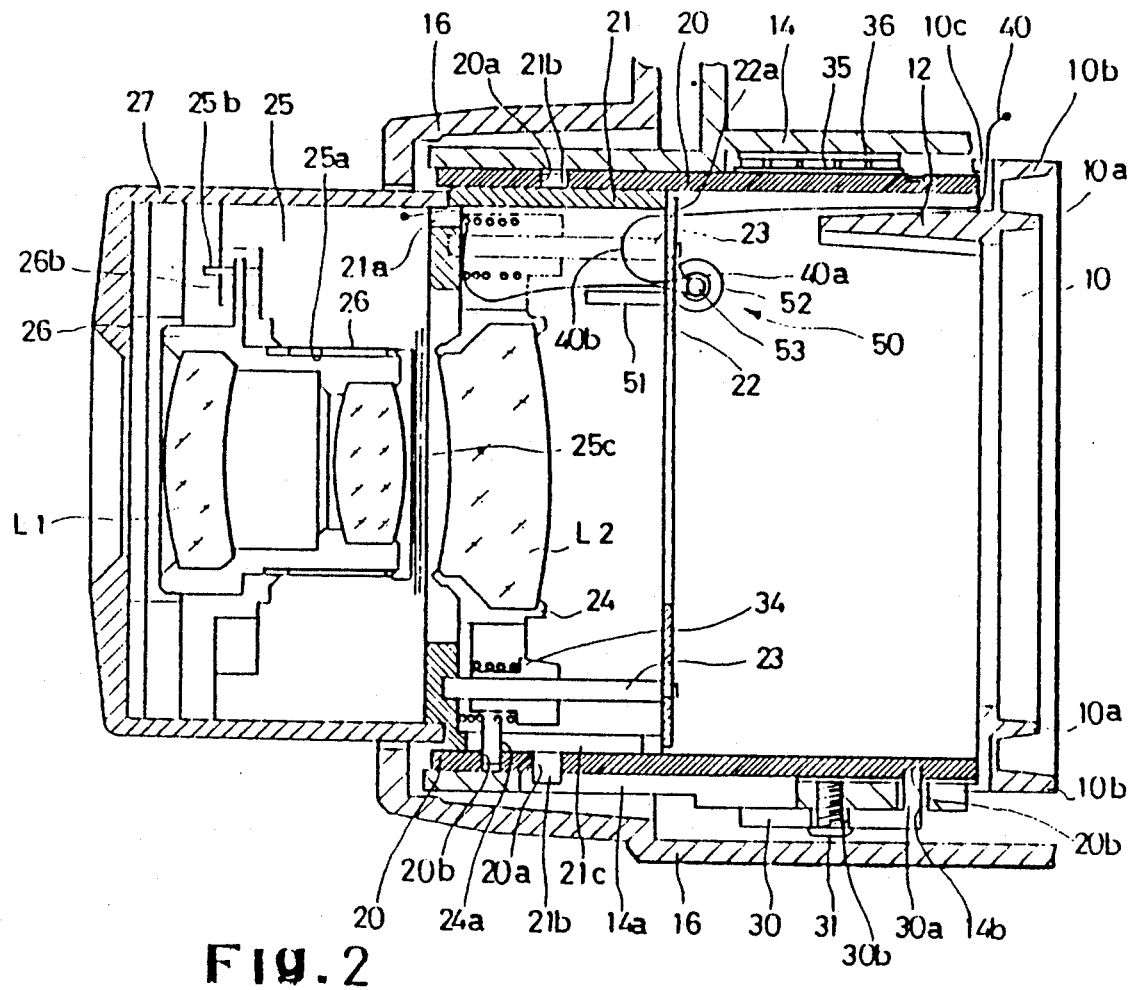

In FIG. 2 which shows the longest focal length position, the front lens group frame 21 is brought in the most advanced position in which the lens cover 27 is projected most. In this position, the lens cover 27 protrudes from the cam ring 20 and only the front lens group frame 21 is engaged in the cam ring 20. However, since two of the three pins 21b of the front lens group frame 21 are restricted by the front lens group cam grooves 20a of the cam ring 20 and the straight guide grooves 14 of the stationary barrel 14, a possibility of an undesirable fluctuation or inclination of the front lens group frame 21 with respect to the optical axis can be decreased. As a result, the inclination of the lens cover 17 can be also prevented, thus resulting in a prevention of the deviation of the optical axis of the front and rear lens groups L1 and L2.

Furthermore, since one of the pins 21b of the front lens group frame 21 does not protrude beyond the associated front lens group cam groove 20a of the cam ring 20, it is possible to mount the focal length code plate 35 onto the outer periphery of the cam ring 20 even under the provision of the three front lens group cam grooves 20a. This contributes to an effective utilization of a space, resulting in a realization of a compact and small camera.

Furthermore, since the rear lens group frame 24 is continuously biased backward by the coil springs 34, no fluctuation of the rear lens group frame 24 takes place during zooming, and accordingly, even if the direction of the zooming operation changes, a so-called backlash does not occur.

Note that the term pin" used for the cam followers to be fitted in the cam grooves, referred to in the present specification can include a roller or the like.

It is also possible to provide more than three cam grooves 20a on the cam ring 20. In this alternative, one or more than one pin 21b does or do not protrude beyond the associated cam groove or grooves 20a.

It goes without saying that the present invention can be applied to a zoom lens having a lens group other than or in addition to the front and rear lens groups L1 and L2.

As can be understood from the above discussion, according to the present invention, the number of front lens group cam grooves provided on the cam ring is larger than that of the rear lens group cam groove, and more than one straight guide grooves is provided on the stationary barrel, so that the front lens group frame has the pins extending through the front lens group cam grooves to be fitted in the straight guide grooves, and a pin or pins which is or are fitted in the front lens group cam groove or grooves but does not or do not project therefrom. Accordingly, the inclination or deviation of the front lens group frame with respect to the optical axis can be prevented or at least reduced, thus resulting in the prevention of the deviation of the optical axis even in a position in which the front lens group largely projects from the cam ring. Furthermore, since at least one pin does not protrude from the associated front lens group cam groove, it is possible to place the focal length code plate in a position in which the above-mentioned cam groove is covered by the focal length code plate. This also contributes to a realization of a compact and small zoom lens camera and a compact and small camera having such a zoom lens.

I claim:

1. In a zoom lens having a stationary barrel secured to a camera body, a cam ring rotatably fitted in the stationary barrel, a front lens group frame movable in the optical axis direction in the cam ring, a front lens group supported by the front lens group frame, and a rear lens group supported in the cam ring so as to move in the optical axis direction, said cam ring being provided with front lens group cam grooves and rear lens group cam grooves, so that when the cam ring rotates, the front lens group and the rear lens group are moved in the optical axis direction, wherein the number of said cam ring front lens group cam grooves is greater than the number of said rear lens group cam grooves.

2. A cam mechanism according to claim 1, wherein said stationary barrel has at least one straight guide groove, and wherein said front lens group frame has at least one pin which extends through the associated front lens group cam groove to be fitted in the straight guide groove and at least one pin which is fitted in the associated front lens group cam groove but does not project therefrom.

3. A cam mechanism according to claim 2, wherein said cam ring is provided on its outer periphery with a focal length detecting code plate which is located on the cam groove in which the pin which is fitted in the associated front lens group cam groove but does not project therefrom is fitted.

4. A cam mechanism according to claim 1, wherein the number of the front lens group cam grooves is more than two.

5. A cam mechanism according to claim 4, wherein said front lens group cam grooves are spaced at a substantially equiangular distance.

6. A cam mechanism according to claim 5, wherein said rear lens group cam groove is located between the front lens group cam grooves.

7. A cam mechanism according to claim 5, wherein more than one rear lens group cam grooves is provided between the front lens group cam grooves.

8. A cam mechanism according to claim 2, further comprising at least one guide rod which is provided on the front lens group frame to support the rear lens group so as to linearly move.

9. A cam mechanism according to claim 8, wherein said front lens group frame is provided with at least one through opening through which said pin of the rear lens group extends to be fitted in the associated rear lens group cam groove of the cam ring.

10. A cam mechanism according to claim 2, further comprising means for adjusting the axial position of the cam ring.

11. A cam mechanism according to claim 10, wherein said cam ring is provided on its outer periphery with at least one circumferential groove or projection.

12. A cam mechanism according to claim 11, further comprising a thrust member which is provided on the stationary barrel to move in the optical axis direction together with the cam ring and not to rotate relative to the cam ring and which has at least one projection or groove which can be engaged by the circumferential groove or projection of the cam ring.

13. A cam mechanism according to claim 12, further comprising means for moving the thrust member in the optical axis direction and for locking the thrust member to the stationary barrel at a desired position.

14. A cam mechanism in a zoom lens comprising a rotatable cam ring, a front lens group frame movable in the optical axis direction in the cam ring, a rear lens group frame movably supported in the optical axis direction, and pins provided on the front and rear lens group frames, said cam ring being provided with cam grooves in which said respective pins extend and are fitted, said cam mechanism including at least one straight guide groove, fewer than all of said pins extending into said cam grooves have a length to extend into said at least one straight guide groove.

15. A cam mechanism according to claim 14, wherein said cam ring includes an outer periphery with a focal length detecting code plate provided on said outer periphery, said code plate located on the cam groove in which a pin which is not fitted in said at least one straight guide groove is fitted, to detect the focal length in accordance with the angular displacement of the cam ring.

16. A cam mechanism in a zoom lens comprising a rotatable cam ring, a front lens group frame movably supported and movable in the optical axis direction in the cam ring, a rear lens group frame movably supported and movable in the optical axis direction, and pins provided on each of said front and rear lens group frames, said cam ring comprising cam grooves into which said pins extend and are fitted, said cam mechanism further comprising at least one straight guide groove into which fewer than all said pins extending into said cam grooves are fitted, said guide groove positioned radially outwardly of said cam grooves, with respect to said optical axis.

* * * * *